(12) United States Patent
Maschke

(10) Patent No.: US 7,047,091 B2
(45) Date of Patent: May 16, 2006

(54) METHOD FOR DETERMINING A GRAPHIC PRESENTATION FOR VISUALIZING PROGRESS OF A PROJECT

(75) Inventor: Michael Maschke, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 378 days.

(21) Appl. No.: 10/456,070

(22) Filed: Jun. 6, 2003

(65) Prior Publication Data
US 2004/0078096 A1 Apr. 22, 2004

(30) Foreign Application Priority Data
Jun. 6, 2002 (DE) ............................... 102 25 225

(51) Int. Cl.
*G05B 15/00* (2006.01)
*G06F 17/00* (2006.01)
*G06F 19/00* (2006.01)

(52) U.S. Cl. ............................. 700/83; 700/90; 700/97; 700/99

(58) Field of Classification Search .................. 700/83, 700/90, 97, 99, 100, 108; 705/1, 7, 8, 9, 705/32; 717/101–103; 715/751, 752, 772; 702/82; 345/440
See application file for complete search history.

(56) References Cited

U.S. PATENT DOCUMENTS

| | | | |
|---|---|---|---|
| 5,907,490 A | 5/1999 | Oliver | |
| 6,714,829 B1* | 3/2004 | Wong | 700/101 |
| 6,839,722 B1* | 1/2005 | Buchner | 707/200 |
| 2002/0087381 A1* | 7/2002 | Freeman et al. | 705/9 |
| 2002/0178036 A1* | 11/2002 | Murata et al. | 705/7 |
| 2003/0014434 A1* | 1/2003 | Sebesta | 707/500 |
| 2003/0046134 A1* | 3/2003 | Frolick et al. | 705/8 |

FOREIGN PATENT DOCUMENTS

| | | |
|---|---|---|
| DE | 196 45 654 | 5/1998 |
| DE | 199 11 699 | 9/2000 |
| WO | WO 99/18530 | 4/1999 |

OTHER PUBLICATIONS

Patent Abstracts of Japan for Japanese Publication No. 2000039904 A—Feb. 8, 2000 Application No. 10208031.

* cited by examiner

*Primary Examiner*—Anthony Knight
*Assistant Examiner*—Michael B. Holmes
(74) *Attorney, Agent, or Firm*—Schiff Hardin LLP

(57) ABSTRACT

In a method for determining a graphic presentation progress that work groups in a set of work groups have made for realizing sub-projects of a project for which they are respectively responsible are determined at time intervals. Average progresses of the project allocated to the time intervals are calculated from the details about the progresses of the corresponding sub-projects. A predicted future time curve of the average progress of the project is calculated based on the average progresses of the project and is graphically displayed.

9 Claims, 4 Drawing Sheets

FIG 3

Please load the following Internet page
http://Project A/Sub-project 1 — 31
on your computer and fill
it out accordingly.

Please indicate how far the
sub-project 1 of project A
you are heading has progressed.

50

☐ %

51 o.k.

52

METHOD FOR DETERMINING A GRAPHIC PRESENTATION FOR VISUALIZING PROGRESS OF A PROJECT

BACKGROUND OF THE INVENTION

1. Field of the Invention

The present invention is directed to a method for determining a graphic presentation, the graphic presentation being of the type employed for visualizing the progress of a project.

2. Description of the Prior Art

Unexpected postponements that can jeopardize the on-time end of a project can occur in the implementation of projects. As used herein "project", for example, is a redevelopment or improvement of an apparatus, or of a work process or of a computer program. The end of the project is, for example, the delivery date of the device or computer program to be developed. The course or progress of the project can be monitored with, for example, a milestone trend analysis of a first-pass-yield measurement.

The milestone trend analysis monitors whether the project has reached a predefined progress at prescribed points in time.

In the first-pass-yield measurement, workers on the project define work packets they are to implement and those points in time at which the corresponding work packets should be finished. The work packets, however, are not standardized. The workers also have the possibility of reporting a work packet that was not finished on time as having been ended and of defining the remaining jobs as a new work packet.

An estimate of the future course of the progress of the project is not possible with the milestone trend analysis or the first-pass-yield measurement.

German OS 196 45 654 discloses an arrangement and a method for self-governing business monitoring of decentrally organized economic units. A central unit of the arrangement includes an updating module that independently and discontinuously requests relevant data via a network of sub-units by means of a specific information acquisition software. The sub-units are composed of a sub-communication interface with a sub-output unit, a sub-input unit, an embedded computer and a specific sub-unit software. The sub-output unit communicates unambiguous questions to a third party and accepts every input. The central unit can be integrated in a higher-ranking EDP system, a data exchange being possible as a result.

German OS 199 11 699 discloses a method for monitoring, controlling and/or optimizing process and/or work project plans. In the context of this method, an actual status is determined on the basis or process and/or work project plans of work units that have already been acquired, and at least one reference process and/or reference work project plan of a work unit is acquired by indicating performance features. Modified process and/or work execution plan for the work unit are produced based on the actual status and/or the reference status and the acquired time and/or performance features.

U.S. Pat. No. 5,907,490 discloses an apparatus for evaluating the progress of a project. The apparatus has a computer and a computer program running on the computer. The computer receives data about project objectives from a datafile provided therefor, determines the current progress and graphically presents a representation of the progress.

SUMMARY OF THE INVENTION

An object of the present invention is to provide a method with which a graphic presentation is automatically produced, and future progress of a project can be recognized with the graphic presentation.

This object is achieved in accordance with the invention in a method for the automatic determination of a graphic presentation that includes the following steps.

A set of electronic pages is offered that are stored in a first computer connectable to a communication network, with a respective electronic pages of the set of electronic pages being allocated to work groups from among a set of work groups, and the set of work groups is allocated to a project. Each work group is provided for realizing sub-projects allocated to the project, and the electronic page allocated to the respective work group contains a request to indicate a detail about the progress of the sub-project of the corresponding work group.

Requests are made at time intervals from a second computer to the communication network to all work groups of the set of work groups to load the electronic page allocated thereto from the first computer.

The filled-out electronic pages of all work groups of the set of work groups are received.

An average progress of the project is automatically determined at the time intervals from the details about the progresses of the corresponding sub-projects on the basis of the filled-out electronic pages.

A predicted, future time curve of the average progress and of the predicted completion of the project is automatically determined based on the average progresses of the project allocated to the time intervals.

The predicted, future course of the average progress of the project is automatically graphically displayed on a further electronic page.

The point in time of the predicted completion is compared to the planned completion of the project.

An e-mail is automatically generated with a corresponding message if the project is to be finished earlier than predicted and the e-mail is sent to a specified person.

As noted above, a "product" is the improvement or redevelopment of an apparatus, of a computer program, of a system, or of a work process. For realizing the project, the project is divided into a number of sub-projects. Each of the sub-projects is handled by a work group. Further, the electronic pages of the set of electronic pages are stored in the first computer, with one of the pages being allocated to one of the work groups. The first computer is connectable to the communication network, so that the electronic pages can be loaded with the second computers connected to the communication network. Inventively, each work group is requested to load its electronic page allocated to it from the first computer, the request coming at time intervals that can be periodic or non-periodic. In a preferred embodiment of the invention, the request can be automatically generated by the first computer and sent to the work groups in the form of an e-mail. In order for the method to be implemented especially easily for the work group, the e-mails have a link to the corresponding electronic page.

The electronic pages contain a request to indicate a detail about the progress of the work group with respect to its sub-projects. A detail about the progress of the sub-project means a designation about the extent to which the sub-project has already been realized with reference to the completed sub-project. This detail can be specified as a percentage with respect to the completed sub-project.

The work groups fill out their electronic pages and communicate them to the first computer. The first computer receives the filled-out electronic pages, extracts the information about the progresses of the individual sub-projects and calculates the average progress of the overall project therefrom. Since the first computer receives the particulars about the progresses of the sub-projects at time intervals, it can calculate a time curve of the average progress of the overall project up to the current average progress. Based on the identified curve, the first computer subsequently calculates the predicted future curve of the average progress. The first computer can calculate the predicted curve with, for example, linear interpolation or by means of a second-degree polynomial on the basis of the current and of the past curve of the average progress of the overall project.

Subsequently, the graphic presentation of the predicted curve is presented on the further electronic page.

The object of the invention is also achieved in a method for the automatic determination of a graphic presentation that having the following steps.

A set of e-mails is automatically generated at time intervals with a computer connectable to a communication network, with respective e-mails of the set of e-mails being allocated to a work group from among a set of work groups, and the set of work groups being allocated to a project. Each work group is provided for realizing sub-projects allocated to the project, and the e-mail allocated to the respective work group contains a request to indicate a detail about the progress of the sub-project of the corresponding work group and to communicate this detail to the computer.

The e-mails are automatically communicated to the corresponding work groups. The details about the progresses of the sub-projects are automatically received. An average progress of the project is automatically determined at the time intervals from the details about the progresses of the corresponding sub-projects. A predicted, future time curve of the average progress and of the predicted completion of the project is automatically determined based on the average progresses of the project at the time intervals. The predicted, future course of the average progress of the project is automatically graphically displayed. The point in time of the predicted completion to the planned completion is compared of the project. A further e-mail is automatically generated with a corresponding message if the project is to be finished earlier than predicted, and the further e-mail is sent to a specified person.

Differing from the first embodiment of the inventive method, a set of electronic pages for the work groups is not provided. Instead, the computer generates the e-mails at time intervals and automatically sends them to the corresponding work groups. The e-mails can be implemented such that the particulars about the progresses of the work groups intended for the computer can be sent back to the computer by means of the reply functionality of the e-mail system.

The automatic request to the individual work groups facilitates obtaining reliable data about the progress of the individual sub-projects. The electronic page containing the graphic presentation, moreover, can likewise be loaded from the computer in which the electronic page containing the graphic presentation is stored in a simple way with a further computer connected to the communication network. The project director of the overall project, for example, can thus be informed in a simple and fast way as to whether the project will be completed by a predetermined deadline.

In a version of the invention, an automatic determination is additionally made—based on the predicted future course of the average progress of the project—as to whether the project will be completely realized by a target date. The electronic page containing the graphic presentation then can contain a corresponding indication.

Since the method is particularly provided for internal use, for example within an industrial concern, the communication network according to one embodiment of the invention is an Intranet.

According to a further version of the invention, the electronic pages are written in the hypertext markup language (HTML).

In a preferred embodiment of the invention the project director of the project is automatically informed when the predicted future course of the average progress of the project shows that the project will be completely realized later than a target date.

Advantages of the invention are, for example, that different projects can be compared due to the standardization of the values utilized for the measurement. Additionally, the graphic presentation supplies a predictive estimate for the completion of the project. The graphic presentation, moreover, yields a surveyable presentation, particularly in the Intranet.

DESCRIPTION OF THE DRAWINGS

FIG. 3 shows an automatically generated e-mail in accordance with the invention.

FIG. 5 shows another automatically generated e-mail in accordance with the invention.

DESCRIPTION OF THE PREFERRED EMBODIMENTS

Figure 1:
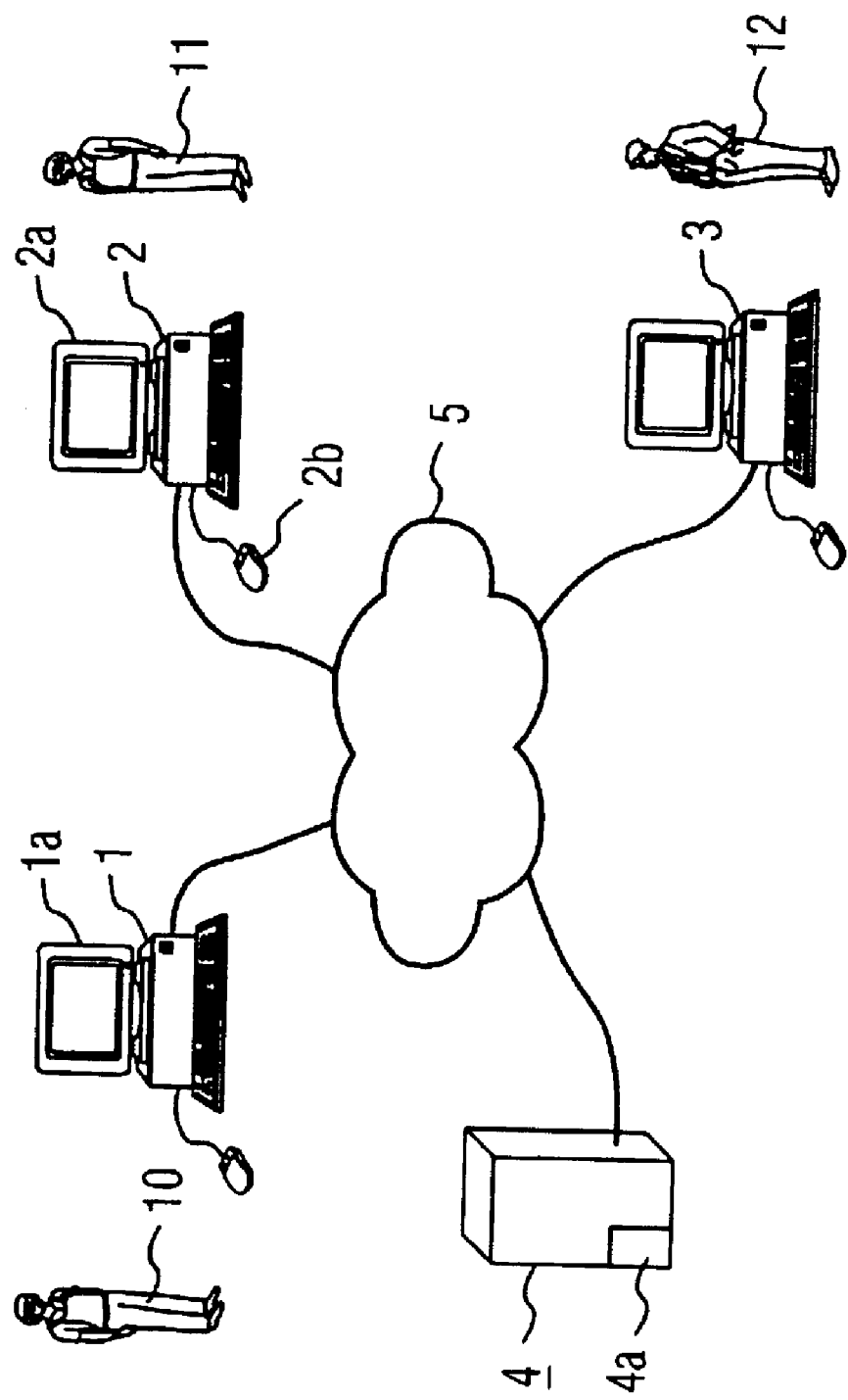
FIG. 1 illustrates computers connected to an Intranet in accordance with the invention.

FIG. 1 shows a number of computers 1–3 and a server 4 that are respectively connected to an Intranet 5 of an industrial concern. In the present exemplary embodiment, the computer 1 is assigned to a project director 10 who monitors the progress of a project A. The project A can, for example, be a redevelopment or improvement of an apparatus, a system, a work process or a computer program. The project A was subdivided into a number of sub-projects for its realization, these being led by several persons. A person 11 responsible for a sub-project 1 and a person 12 responsible for a sub-project 2 are shown in FIG. 1 as an example. In the present exemplary embodiment, moreover, the computer 2 is assigned to the person 11 responsible for the sub-project 1, and the computer 3 is assigned to the person responsible for the sub-project 2.

Figure 2:
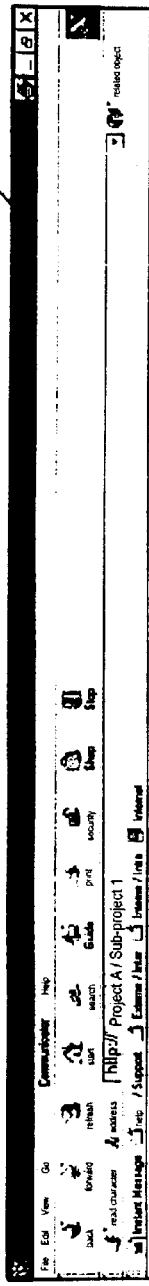
FIG. 2 shows an Intranet page in accordance with the invention.
Figure 2:
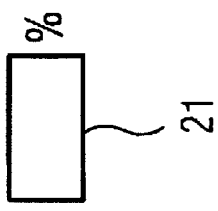
Figure 2:

So that the project director 10 of the project A can monitor the progress of the project A in order, in particular, to recognize early whether the project A will be completed by a fixed deadline, a set of electronic pages allocated to the project A is stored in the server 4. The pages can be written in the HTML format in the present exemplary embodiment. One electronic page of the set of electronic pages is allocated to one of the sub-projects of the project A, respectively. Every person responsible for a sub-project loads the electronic page allocated to his/her sub-project from the server 4 onto a computer connected to the Intranet 5 at time intervals, on a weekly basis in the present exemplary embodiment. The electronic pages respectively contain a request to indicate a percentage particular about the progress of the corresponding sub-project. As an example, FIG. 2 shows an electronic page 20 allocated to the sub-project 1, said page 20 having a field 21 in which the person 11 responsible for the sub-project 1 should indicate the progress of his/her sub-project 1.

So that the persons responsible for the sub-projects load the electronic pages allocated to their sub-projects from the server 4 and fill them out on a weekly basis in the exemplary embodiment, a computer program runs on the server 4 and generates an e-mail for each person 11, 12 at the end of a week in the exemplary embodiment and sends it to the corresponding person 11 and 121. As an example, FIG. 3 shows an e-mail 30 intended for the person 11 responsible for the sub-project 1.

In addition to containing a request to the person 11 the load the electronic page 20 from the server 4, the e-mail 30 in the present exemplary embodiment also comprises a link 31 that points to the electronic page 20. After the person 11 responsible for the sub-project 1 has received the e-mail, for example with the computer 2, and has read it with a monitor 2a allocated to the computer 2, only the link 31 of the e-mail 30 need consequently be activated in order to load the electronic page 20 from the server 4 into the computer 2.

After the person 11 has activated the link 31 of the e-mail 30, the electronic page 20 is loaded from the server 4 onto the computer 2. Subsequently, the person 11 fills out the field in conformity with the current progress of his/her sub-project 1 and communicates the filled-out electronic page 20 to the server by clicking on a field 22 labeled "O.K." with a computer mouse 2b allocated to the computer 2.

Subsequently, the server 4 receives the filled-out electronic page 20 and extracts the information about the current progress of the sub-project 1 with a computer program running on the server 4 by reading out the filled-out field 21. In addition to receiving the filled-out electronic page 20, the server 4 receives correspondingly filled out electronic pages from the persons responsible for the remaining sub-projects of the project A and extracts the corresponding particulars about the current progresses of the individual sub-projects.

Subsequently, the computer program automatically calculates the current, average progress of the project A. For example, the average progress of the project A is calculated from the arithmetic average of all details about the progresses of the sub-projects. The calculated, current average progress of the project A is subsequently stored in a memory 4a of the server 4.

Calculated average progresses of the project A from the past weeks are also stored in the memory 4a of the server 4 in addition to the current average progress of the project A. The computer program running on the server 4 uses the current average progress of the project A and the past average progresses of the project A to calculate a trend curve 42 for the future course of the progress of the project A. For example, the trend curve 42 is calculated from the calculated, average progresses of the project A by means of linear interpolation or a second-degree polynomial. The trend curve 42 is thus a predicted curve of the average course of the progress of the project A.

Figure 4:
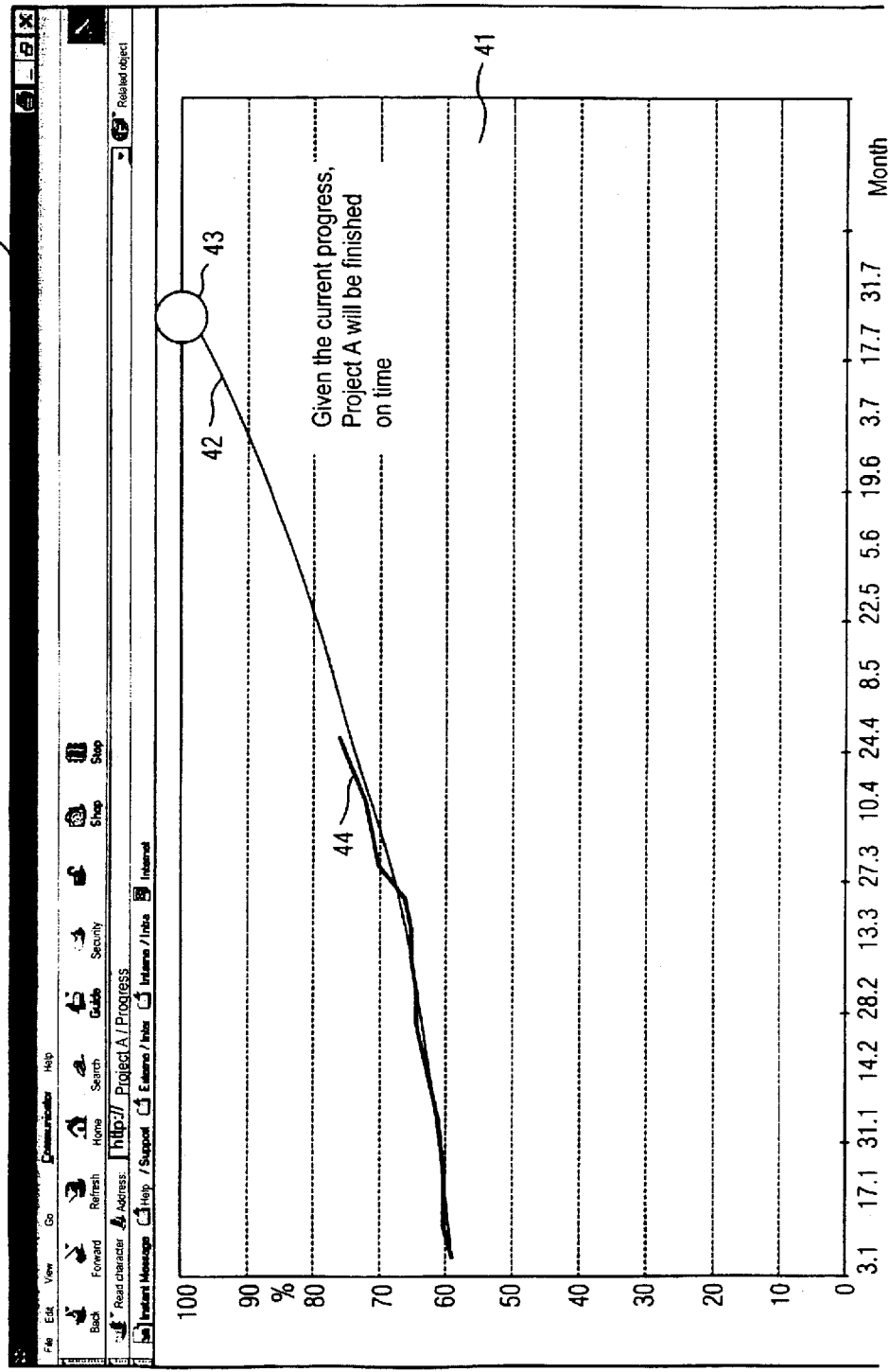
FIG. 4 shows an Intranet page comprising a graphic in accordance with the invention.

After the trend curve 42 has been calculated a graphic 41 of a further electronic page 40 shown in FIG. 4 is updated, said further page 40 being likewise written in the HTML format and stored on the server 4 in the present exemplary embodiment. The trend curve 42 reflects the calculated, predicted curve of the average progress of the project A as a function of the time.

In the exemplary embodiment, the computer program running on the server 4 automatically updates the graphic 41 when the new, current average progress of the project A has been re-determined and the predicted course of the average progress has been calculated. The computer program updates the graphic as follows.

The abscissa (time axis) of the coordinate system of the graphic 41 is determined based on the predicted conclusion of the project and the earliest point in time of a determination of an average progress of the project A. The ordinate of the coordinate system indicates the anticipated progress as a percentage. When the trend curve 42 (predicted curve of the progress of the project A) reaches 100%, then this corresponds to the predicted completion of the project A.

In the exemplary embodiment, the predicted completion of the project A is illustrated with a circle 43. The circle 43 is colored green when the project A is to be completed later than predicted. The circle is colored red when the project A is to be completed earlier than predicted, and the circle 43 is colored yellow when the project A is to be finished approximately when predicted. In the exemplary embodiment, the project is predicted to be finished just about as planned. The date of the planned completion of the project A is stored in the memory 4a of the server 4.

In the exemplary embodiment, the graphic 41 also has a curve 44 that shows the identified, average progresses of the project A.

Since the graphic 41 is reproduced on the electronic page 40 and is stored on the server 4, the project director 10 can load the electronic page 40 from the server 4 with his/her computer 1 and view it at a picture screen 1a allocated to the computer 1.

In the exemplary embodiment, the computer program running on the server 4 automatically generates an e-mail (not shown in the Figures) intended for the project director 10 when the project A is to be finished earlier than predicted. The e-mail contains a message to that effect.

FIGS. 1 and 4 are referenced again for an alternative embodiment of the invention that is described below. Instead of generating the set of electronic pages stored in the server 4, the electronic page 20 thereof being shown in FIG. 2, the server 4 automatically generates a set of e-mails at time intervals—on a weekly basis in the present exemplary embodiment—one thereof being intended for the persons, for instance the persons 11 and 12, leading the sub-projects of the project A. As an example, FIG. 5 shows an e-mail 50 that is intended for the person 11 leading the sub-project 1. The e-mail 50 contains a request to specify a detail about the progress of the corresponding sub-project. This detail is a percentage of the progress of the corresponding sub-project and is supposed to be entered into a field 51 of the e-mail 50.

After the person 11 responsible for the sub-project 1 has read the e-mail 50 and appropriately filled out the field 51, said person activates a field 52 of the e-mail 50 labeled with "O.K.", whereupon the information about the progress of the sub-project 1 is automatically communicated to the server 4.

The server 4 subsequently receives the particular about the progress of the sub-project 1. The server 4 correspondingly receives particulars about the progresses of the remaining sub-projects of the project A. The server 4 subsequently calculates the average progress of the project A and updates the graphic 41, as described above.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for automatically determining a graphic presentation for visualizing progress of a project, comprising the steps of:

for each work group in a plurality of work groups engaged in a project having a plurality of sub-projects, with the work groups being respectively responsible for different ones of said sub-projects, creating an electronic page containing a request to indicate a detail regarding progress of the respective sub-project for each work group, and storing said electronic pages in a first computer in communication with a communication network;

allocating respective second computers, communicating with said communication network, to the work groups and, at successive time intervals, loading the electronic page allocated to a work group from the first computer into the second computer allocated to that work group to transmit said request;

responding to said request at said second computer by filling out the electronic page thereat, thereby producing a filled-out electronic page, and transmitting the filled-out electronic page from the respective second computer to the first computer via said communication network;

for each time interval, determining, at said first computer, an average progress of said project from the respective filled-out electronic pages from the respective work groups;

from the respective average progresses for said time intervals, automatically determining a predicted time curve of an overall average progress of said project and a predicted completion of said project;

at said first computer, automatically graphically displaying said predicted time curve on a further electronic page;

comparing a point in time of said predicted completion to a planned completion of said project using said displayed time curve, thereby obtaining a comparison result;

if said comparison result indicates said project will be completed earlier than indicated by said predicted time curve, automatically generating an e-mail with a message indicating early completion of said project; and transmitting said e-mail to a predetermined recipient.

2. A method as claimed in claim 1 comprising the additional step of sending a plurality of respective e-mails to said work groups from said first computer to the respective second computer via said communication network, and including a link in each e-mail to the respective electronic page for that work group, and including in each e-mail a request to load the electronic page via said link.

3. A method as claimed in claim 1 wherein the step of comparing a point in time for the predicted completion of said project comprises comparing a completion date obtained from said predicted time curve to a target date for completion of said project.

4. A method as claimed in claim 1 comprising employing an Intranet as said communication network.

5. A method as claimed in claim 1 comprising, if said comparison result indicates said project will be completed later than said planned completion, automatically informing a project director of said project from said first computer.

6. A method for automatically determining a graphic presentation for visualizing progress of a project, comprising the steps of:

at successive intervals, for each work group in a plurality of work groups engaged in a project having a plurality of sub-projects, with the work groups being respectively responsible for different ones of said sub-projects, automatically generating an e-mail containing a request to indicate a detail regarding progress of the respective sub-project for each work group, and automatically communicating the respective e-mails to said work groups via a communication network;

electronically receiving respective details from the respective groups after each time interval;

for each time interval, automatically determining an average progress of said project from the respective details received from the work groups;

from the respective average progresses for said time intervals, automatically determining a predicted time curve of an overall average progress of said project and a predicted completion of said project;

automatically graphically displaying said predicted time curve;

comparing a point in time of said predicted completion to a planned completion of said project using said displayed time curve, thereby obtaining a comparison result;

if said comparison result indicates said project will be completed earlier than indicated by said predicted time curve, automatically generating a further e-mail with a message indicating early completion of said project; and transmitting said e-mail to a predetermined recipient via said communication network.

7. A method as claimed in claim 6 wherein the step of comparing a point in time for the predicted completion of said project comprises comparing a completion date obtained from said predicted time curve to a target date for completion of said project.

8. A method as claimed in claim 6 comprising employing an Intranet as said communication network.

9. A method as claimed in claim 6 comprising, if said comparison result indicates said project will be completed later than said planned completion, automatically informing a project director of said project.

* * * * *